(12) United States Patent
Yamakawa et al.

(10) Patent No.: US 11,606,744 B2
(45) Date of Patent: Mar. 14, 2023

(54) COMMUNICATION APPARATUS, COMMUNICATION METHOD, AND STORAGE MEDIUM

(71) Applicant: CANON KABUSHIKI KAISHA, Tokyo (JP)

(72) Inventors: Yuichi Yamakawa, Chiba (JP); Tetsuya Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 17/171,877

(22) Filed: Feb. 9, 2021

(65) Prior Publication Data
US 2021/0258870 A1 Aug. 19, 2021

(30) Foreign Application Priority Data

Feb. 13, 2020 (JP) .............................. JP2020-022181

(51) Int. Cl.
*H04W 48/18* (2009.01)
*H04W 76/18* (2018.01)
*H04W 16/02* (2009.01)

(52) U.S. Cl.
CPC .......... *H04W 48/18* (2013.01); *H04W 76/18* (2018.02); *H04W 16/02* (2013.01)

(58) Field of Classification Search
CPC ......... H04W 28/0268; H04W 28/0967; H04W 28/0975; H04W 28/0983; H04W 28/0992; H04W 28/16; H04W 28/18; H04W 28/20; H04W 28/22; H04W 28/24; H04W 76/18; H04W 16/02; H04W 48/18
USPC ........................................................ 370/328
See application file for complete search history.

(56) References Cited

U.S. PATENT DOCUMENTS

2019/0021043 A1\* 1/2019 Youn ................. H04W 36/0055
2020/0137621 A1\* 4/2020 Yang ................. H04W 28/0289

FOREIGN PATENT DOCUMENTS

JP 2019533333 A 11/2019

\* cited by examiner

*Primary Examiner* — Huy C Ho
(74) *Attorney, Agent, or Firm* — Canon U.S.A., Inc. IP Divsion

(57) ABSTRACT

Network slice information indicating a characteristic of a wireless network to be provided by a base station is acquired, and whether the base station provides a predetermined network slice is determined based on the acquired network slice information. If a determination that the base station does not provide the predetermined network slice is made, connection processing for connection between a communication apparatus and the base station is canceled, or connection between the communication apparatus and the base station is disconnected.

20 Claims, 11 Drawing Sheets

FIG.2

| SLICE SERVICE TYPE | SLICE SERVICE TYPE VALUE |
|---|---|
| LOW LATENCY | 101 |
| HIGH RELIABILITY | 102 |

FIG.7

| BASE STATION ID | UNAVAILABILITY CHECK DATE AND TIME |
|---|---|
| 101319425 | 2019/11/28 12:15 |
| 101300480 | 2019/11/28 12:16 |

FIG.8

No base station having a matching slice setting was found.
Do you want to connect without setting a slice?

| YES | NO |

COMMUNICATION APPARATUS, COMMUNICATION METHOD, AND STORAGE MEDIUM

BACKGROUND

Field

The present disclosure relates to a communication apparatus that communicates with a base station.

Description of the Related Art

The 3rd Generation Partnership Project (3GPP) standard specifies network slicing as a mechanism for providing a communication service after designating a network characteristic, such as a bandwidth or latency. A communication apparatus acquires information about a network slice to be provided by a base station and performs connection processing during Radio Resource Control (RRC) connection (Japanese Unexamined Patent Application Publication (Translation of PCT Application) No. 2019-533333).

However, there is a case where the base station cannot provide a desired network slice. For example, in a case where the base station provides the desired network slice to more than a predetermined number of communication apparatuses, the base station can fail to provide the desired network slice depending on the capacity of the base station or a network.

In such a case, if the communication apparatus maintains the connection with the base station, the communication apparatus unnecessarily consumes power for maintaining the connection with the base station, even though the communication apparatus cannot perform communication using the desired network slice.

SUMMARY

Various embodiments of the present disclosure describe enabling connection control based on a network slice provided by a base station.

According to an embodiment of the present disclosure, a communication apparatus includes an acquisition unit configured to acquire network slice information indicating a characteristic of a wireless network to be provided by a first base station, a determination unit configured to determine whether the first base station provides a predetermined network slice, based on the network slice information acquired by the acquisition unit, and a cancellation unit configured to cancel connection processing for connection with the first base station in a case where the determination unit determines that the first base station does not provide the predetermined network slice.

According to another embodiment of the present disclosure, a communication apparatus includes an acquisition unit configured to acquire network slice information indicating a characteristic of a wireless network to be provided by a first base station, a determination unit configured to determine whether the first base station provides a predetermined network slice, based on the network slice information acquired by the acquisition unit, and a disconnection unit configured to disconnect connection with the first base station, based on the determination unit determining that the first base station does not provide the predetermined network slice.

Further features will become apparent from the following description of exemplary embodiments with reference to the attached drawings.

BRIEF DESCRIPTION OF THE DRAWINGS

FIG. 2 is a table illustrating correspondence between slice service types and slice service type values according to one embodiment.

FIG. 7 is a table illustrating an unavailable base station list according to one embodiment.

FIG. 8 is a diagram illustrating an error message according to one embodiment.

DESCRIPTION OF THE EMBODIMENTS

Exemplary embodiments of the present disclosure will be described in detail below with reference to the attached drawings. Configurations to be described in the following exemplary embodiments are only examples, and embodiments of the present invention are not limited to the illustrated configurations.

A communication apparatus according to a first exemplary embodiment will be described in detail below with reference to drawings.

Figure 1:
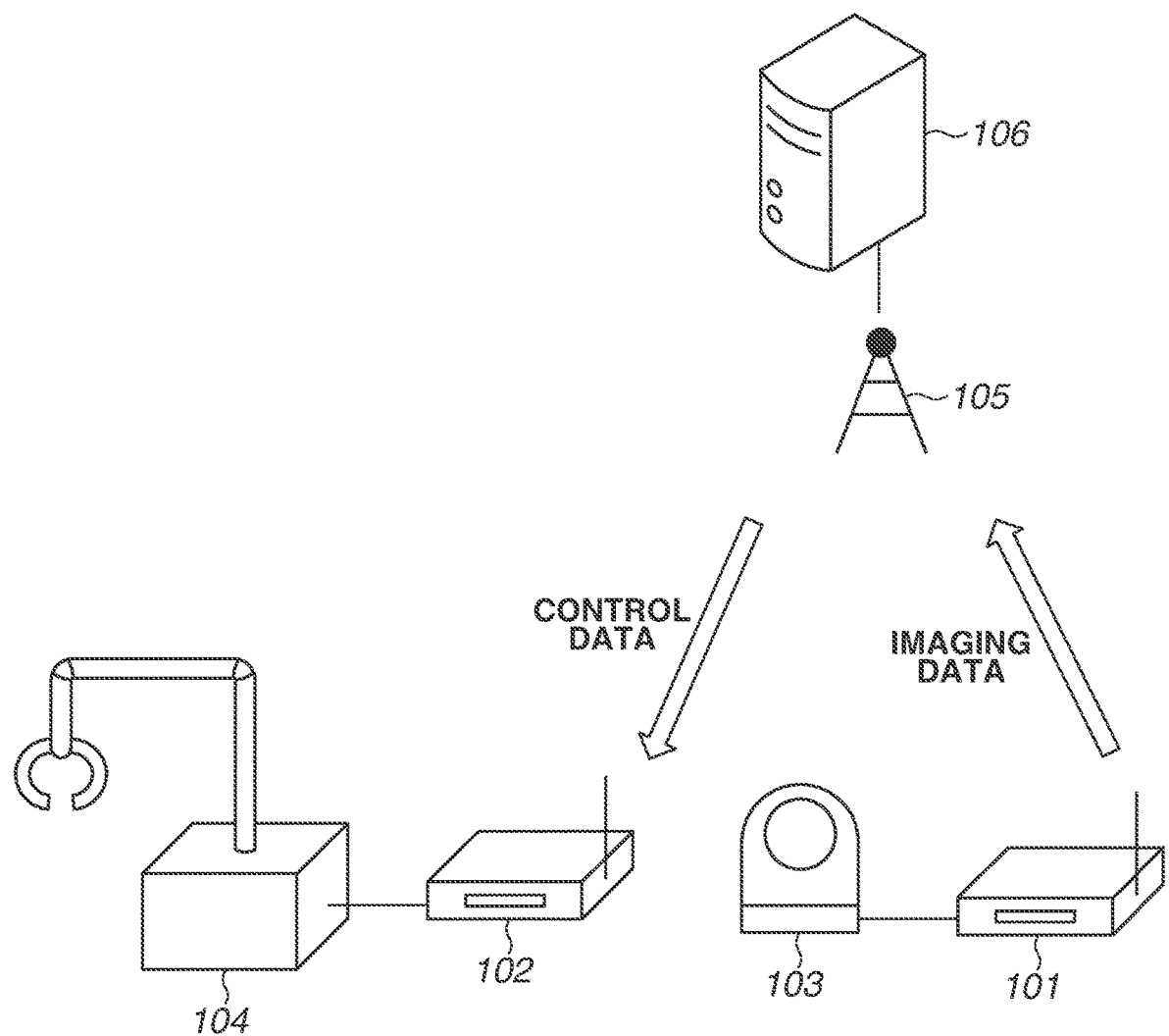
FIG. 1 is a network configuration diagram according to one embodiment.

Communication apparatuses 101 and 102 in FIG. 1 each perform wireless communication compliant with the 3rd Generation Partnership Project (3GPP) standard with a base station 105. A core network apparatus 106 manages a core network formed by a plurality of base stations including the base station 105.

A network camera 103 is connected to the communication apparatus 101. A robot arm 104 is connected to the communication apparatus 102. These connections may be wired connections compliant with standards, such as Ethernet and Universal Serial Bus (USB), or may be wireless connections compliant with standards, such as Institute of Electrical and Electronics Engineers (IEEE) 802.11 series and Bluetooth®.

When the network camera 103 uploads imaging data to a data server (not illustrated), the data is transmitted from the network camera 103 to the communication apparatus 101, from the communication apparatus 101 to the base station 105, and from the base station 105 to the data server in this order. When the robot arm 104 operates based on control data from a remote control server (not illustrated), the data is transmitted from the remote control server to the base station 105, from the base station 105 to the communication apparatus 102, and from the communication apparatus 102 to the robot arm 104 in this order.

The communication apparatus 101 connected to the network camera 103 uses a network slice with low latency to upload the imaging data captured by the network camera 103 to the data server in real time. The communication apparatus 102 connected to the robot arm 104 uses a network slice with high reliability to avoid a malfunction of the robot arm 104. The base station 105 provides the network slice with low latency and the network slice with high reliability. In other words, the network slice indicates a characteristic (service) of a wireless network to be provided by the base station 105. These characteristics are implemented by controlling allocation of time slots and frequency resources provided by the base station 105 (or the core network apparatus 106) in the wireless network. Slice service type values of the above-described network slices are shared by the core network side and the communication apparatus side. FIG. 2 illustrates a list of the slice service type values in the present exemplary embodiment.

Figure 3:
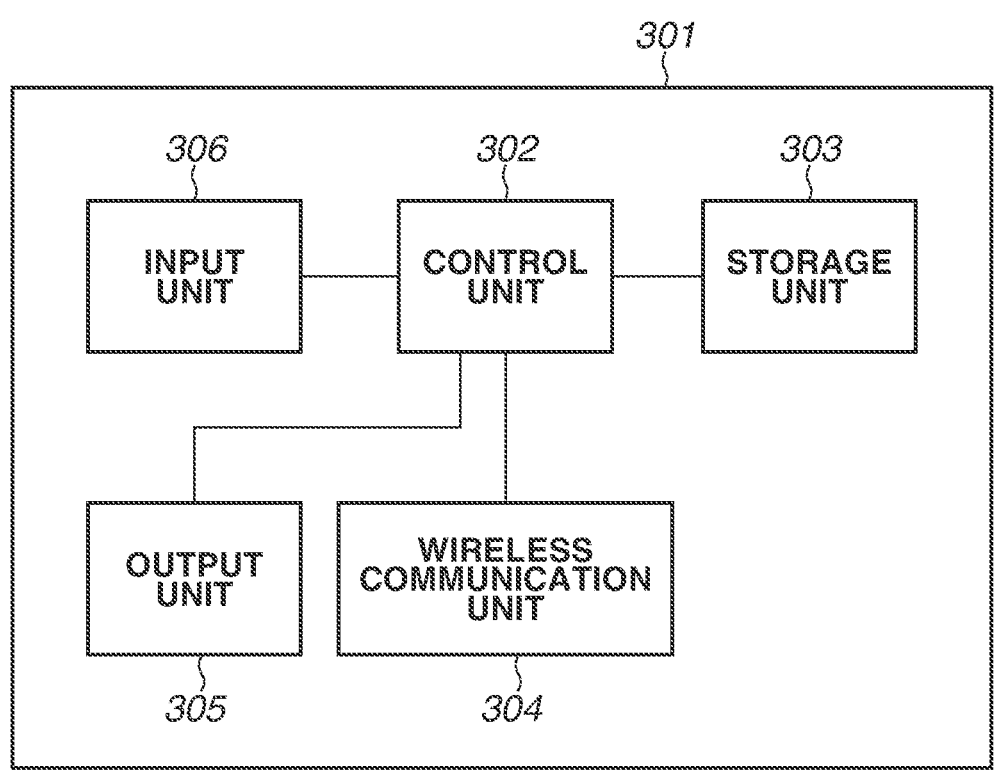
FIG. 3 is a hardware configuration diagram of a communication apparatus according to one embodiment.

FIG. 3 illustrates a hardware configuration 301 of each of the communication apparatuses 101 and 102 of the present exemplary embodiment. The hardware configuration 301 will be described below as a configuration of the communication apparatus 101. The communication apparatus 102 has a similar hardware configuration.

A control unit 302 controls the entire communication apparatus 101 by executing a control program stored in a storage unit 303. The control unit 302 includes one or more processors, such as a central processing unit (CPU) and a micro processing unit (MPU), and controls the entire communication apparatus 101 by executing a computer program stored in the storage unit 303. The CPU and the MPU each function as a computer. The control unit 302 may control the entire communication apparatus 101 based on cooperation between a program stored in the storage unit 303 and an operating system (OS). The control unit 302 may include a plurality of processors, such as a multi-core processor, and control the entire communication apparatus 101 by using the plurality of processors.

The storage unit 303 stores the control program to be executed by the control unit 302, and various types of information, such as communication parameters and captured-image data. The storage unit 303 includes one or more memories, such as a read only memory (ROM) and a random access memory (RAM), and stores a computer program for various operations (described below) and various types of information, such as communication parameters for wireless communication. For the storage unit 303, a storage medium, such as a flexible disk, a hard disk, an optical disk, a magneto-optical (MO) disk, a compact disc ROM (CD-ROM), a CD-recordable (CD-R), a magnetic tape, a nonvolatile memory card, or a digital versatile disc (DVD) may be used other than the memories such as the ROM and the RAM. The control unit 302 executes the control program stored in the storage unit 303, so that the various operations (described below 9 are performed.

A wireless communication unit 304 performs Long-Term Evolution (LTE) or fifth-generation (5G) cellular communication compliant with the 3GPP standard. An output unit 305 is a display unit that performs various types of display, and has the function of outputting visually recognizable information, such as a liquid crystal display (LCD) or a light emitting diode (LED), or the function of outputting sound, such as a speaker. An input unit 306 receives various inputs from a user, or acquires sensor information.

Figure 4:
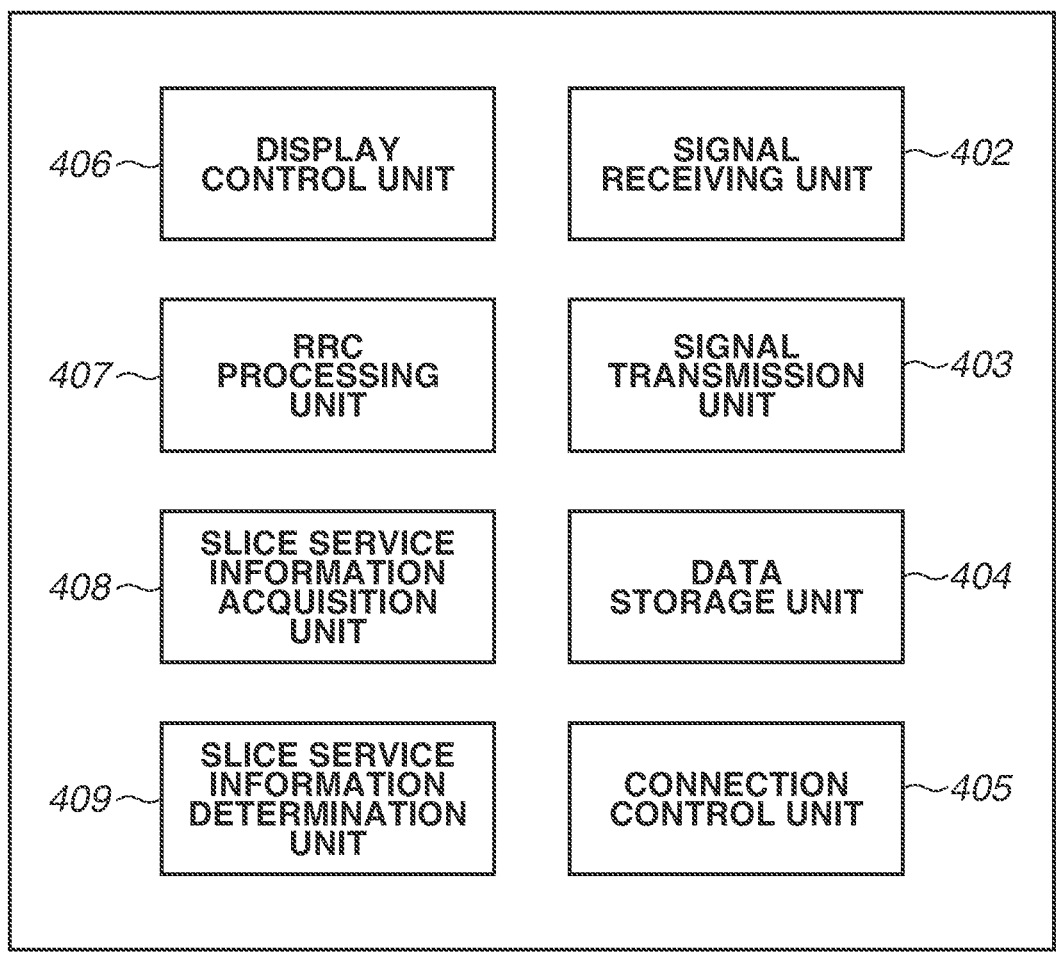
FIG. 4 is a software functional block diagram of the communication apparatus according to one embodiment.

FIG. 4 illustrates a software functional block diagram of each of the communication apparatuses 101 and 102 of the present exemplary embodiment. The software functional blocks will be described below as the blocks of the communication apparatus 101. The communication apparatus 102 includes similar software functional blocks.

The control unit 302 of the communication apparatus 101 reads out a program stored in the storage unit 303 to implement the software functional blocks. At least some of the software functional blocks illustrated in FIG. 4 may be implemented by a hardware device. In the case of the implementation by a hardware device, a dedicated circuit may be generated on a field programmable gateway array (FPGA) from a program for implementing each of the functional blocks by, for example, using a predetermined compiler, and the dedicated circuit may be used as a hardware module having the function of this software module. A gate array circuit may be formed in a manner similar to the FPGA, so that the gate array circuit may be implemented as a hardware device.

A signal receiving unit 402 receives a signal compliant with the 3GPP standard using the wireless communication unit 304, and a signal transmission unit 403 transmits a signal compliant with the 3GPP standard using the wireless communication unit 304. The communication apparatus 101 thus performs LTE or 5G cellular network communication compliant with the 3GPP standard with another external apparatus. A data storage unit 404 causes the storage unit 303 to hold software itself and information, such as authentication information.

A connection control unit 405 performs processing relating to connection to and disconnection from a cellular network base station (e.g., the base station 105) using the wireless communication unit 304. A display control unit 406 performs processing of controlling an image and sound to be output to the output unit 305. A Radio Resource Control (RRC) processing unit 407 performs RRC connection processing and cancellation processing using the wireless communication unit 304. A slice service information acquisition unit 408 acquires slice service information notified by the base station 105, using the wireless communication unit 304.

A slice service information determination unit 409 determines whether a slice service provided by the base station 105 matches with or includes a slice service used by the communication apparatus 101, based on the slice service information notified by the base station 105.

Figure 5:
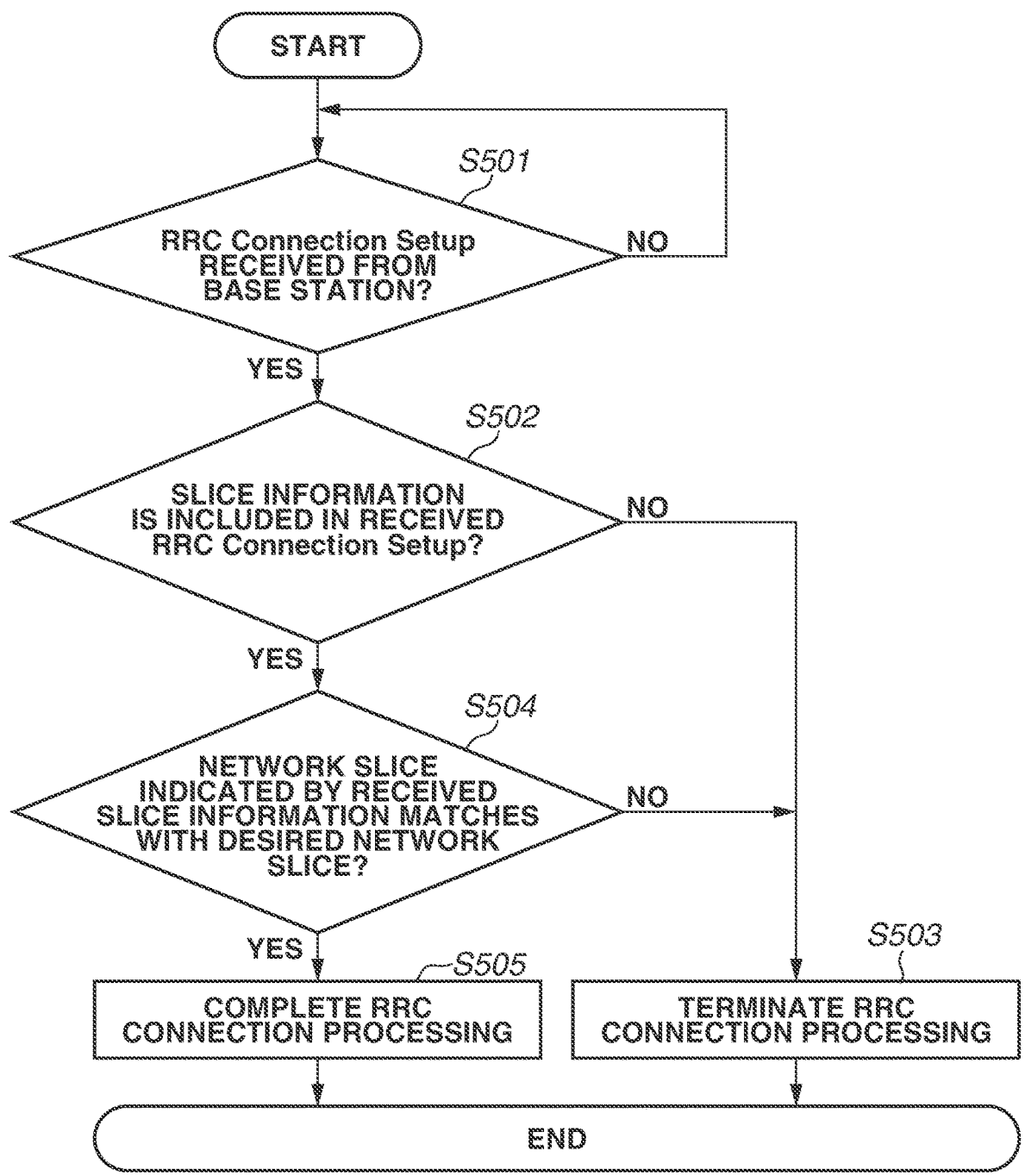
FIG. 5 is a flowchart of processing which is implemented by a communication apparatus according to a first exemplary embodiment.

FIG. 5 illustrates a flowchart of processing which is implemented by the control unit 302 executing a program read out from the storage unit 303 when the RRC connection is performed in the communication apparatus 101 or 102. The communication apparatus 101 will be described below to implement the processing. Similar processing is implemented by the communication apparatus 102 as well.

Some or all of steps in the flowchart illustrated in FIG. 5 may be implemented by a hardware device, such as an application specific integrated circuit (ASIC). The processing in the flowchart illustrated in FIG. 5 begins when the communication apparatus 101 transmits an RRC connection request in response to a user operation of turning on the communication apparatus 101, a user operation of activating the wireless communication unit 304, or a predetermined instruction from an application or an external apparatus (not illustrated). The RRC connection request is a signal for requesting a base station to establish RRC connection compliant with the 3GPP standard, and is transmitted to a base station compliant with the 3GPP standard.

First, in step S501, the communication apparatus 101 determines whether an RRC Connection Setup message is received from the base station 105. If the RRC Connection Setup message is not received (NO in step S501), the communication apparatus 101 waits until the RRC Connection Setup message is received from the base station 105.

If the RRC Connection Setup message is received (YES in step S501), the processing proceeds to step S502. In step S502, the communication apparatus 101 determines whether information about a network slice provided by the base station 105 is included in the received message.

If the information about the network slice is not included in the RRC Connection Setup message (NO in step S502), the processing proceeds to step S503. In step S503, the communication apparatus 101 cancels the RRC connection processing. The cancellation of the connection processing is implemented by, for example, the communication apparatus 101 not transmitting an RRC Connection Setup Complete message which is a response signal to the RRC Connection Setup message.

If the information about the network slice is included in the RRC Connection Setup message (YES in step S502), the processing proceeds to step S504. In step S504, the communication apparatus 101 determines whether the network slice indicated by the received slice information matches with a desired network slice.

For example, if "101" is included as a slice service type value in the received slice information and a slice service type value requested by an application running on the communication apparatus 101 is "101", the communication apparatus 101 determines that the network slices match with each other. For example, if "101" is included as a slice service type value in the received slice information and a slice service type value requested by the network camera 103 connected to the communication apparatus 101 is "101", the communication apparatus 101 determines that the network slices match with each other. If "101" is not included as a slice service type value in the received slice information and a slice service type value requested by an application running on the communication apparatus 101 is "101", the communication apparatus 101 determines that the network slices do not match with each other.

If the network slice indicated by the received slice information does not match with the desired network slice (NO in step S504), the processing proceeds to step S503. In step S503, the communication apparatus 101 cancels the RRC connection processing. If the network slice indicated by the received slice information matches with the desired network slice (YES in step S504), the processing proceeds to step S505. In step S505, the communication apparatus 101 completes the RRC connection processing for connection with the base station 105. Specifically, the communication apparatus 101 transmits an RRC Connection Setup Complete message to the base station 105 to complete the RRC connection processing.

In this way, the network slice information indicating the characteristic of the wireless network to be provided by the base station 105 is acquired, and whether or not the base station 105 provides a predetermined network slice is determined based on the acquired network slice information. If it is determined that the base station 105 does not provide the predetermined network slice, the connection processing for connection with the base station 105 is canceled. The communication apparatus 101 can be thus prevented from connecting to a base station not providing the desired network slice. Therefore, the communication apparatus can obtain a power-saving effect, without consuming power for maintaining connection with the base station.

A second exemplary embodiment of the present disclosure will be described below. In the second exemplary embodiment, a communication apparatus manages base stations not providing a desired network slice, using a list. This list will be hereinafter referred to as the slice-unavailable base station list. FIG. 7 illustrates an example of the slice-unavailable base station list, and a pair of a base station ID (identifier) and an unavailability check date and time (timing at which the corresponding base station not providing a desired network slice is checked) are included in the list.

While the following processing will be described as processing to be performed by a communication apparatus 101, similar processing is performed by a communication apparatus 102. A hardware configuration and a software configuration of the communication apparatus 101 are similar to those of the first exemplary embodiment and therefore will not be described.

Figure 6:
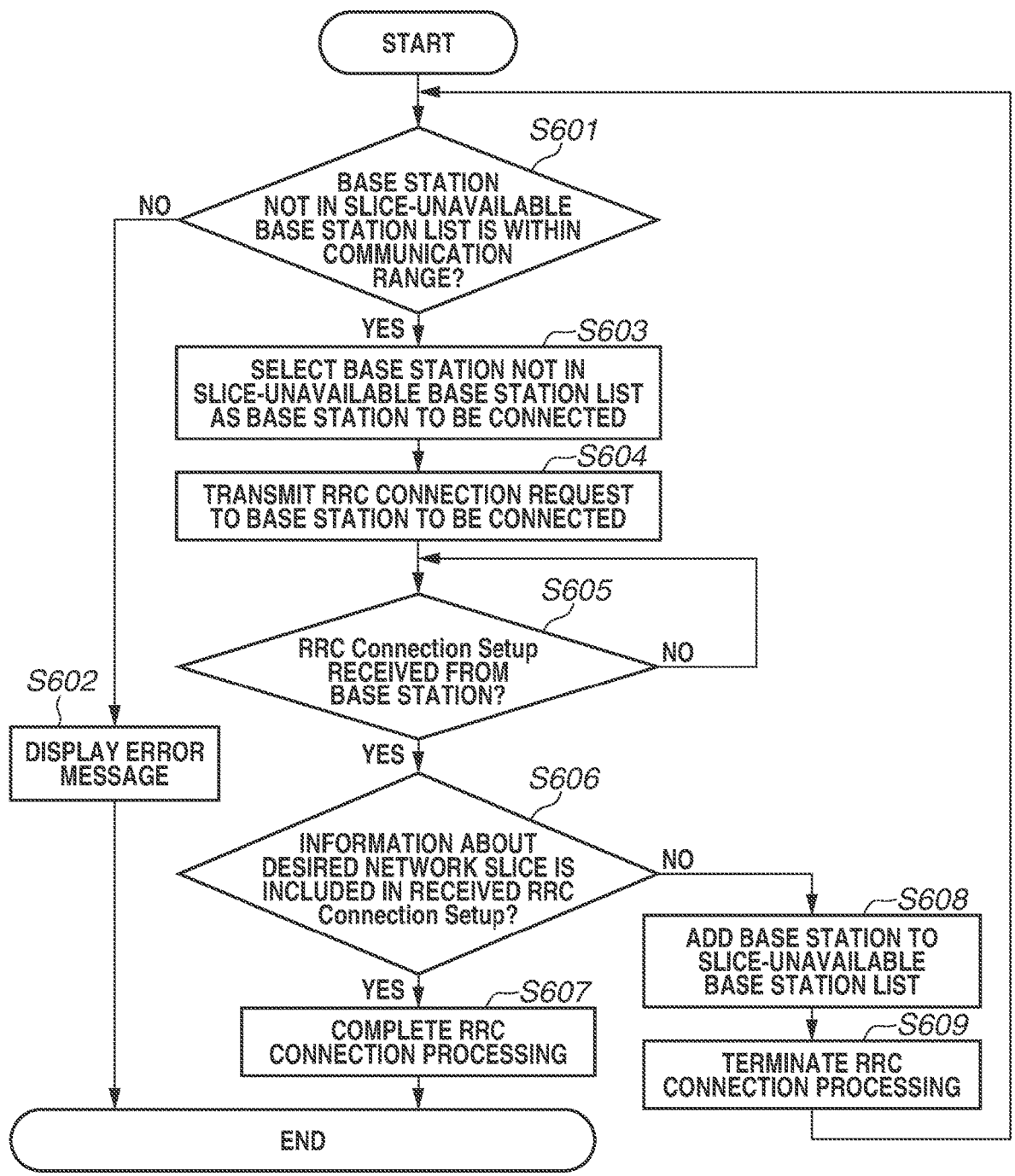
FIG. 6 is a flowchart of processing which is implemented by a communication apparatus according to a second exemplary embodiment.

FIG. 6 illustrates a flowchart of processing to be implemented by execution of a program read out from a storage unit 303 by a control unit 302 when RRC connection is performed in the communication apparatus 101. Some or all of steps in the flowchart illustrated in FIG. 6 may be implemented by hardware such as an ASIC. The processing in the flowchart illustrated in FIG. 6 begins in a case where a user operation of turning on the communication apparatus 101 is performed, a user operation of activating a wireless communication unit 304 is performed, or a predetermined instruction is provided from an application or an external apparatus (not illustrated). At the time when the flowchart illustrated in FIG. 6 begins, the slice-unavailable base station list is empty (no base station information is included).

First, in step S601, the communication apparatus 101 checks whether a base station not in the slice-unavailable base station list is near the communication apparatus 101, i.e., within a communication range of the communication apparatus 101. The communication apparatus 101 performs this check by receiving a broadcast signal from a base station, and comparing the identification information (identifier) of the base station included in the received broadcast signal and the identifier of a base station included in the slice-unavailable base station list.

If the base station not in the slice-unavailable base station list is not near the communication apparatus 101 (NO in step S601), the processing proceeds to step S602. In step S602, the communication apparatus 101 notifies an error message, i.e., performs display or audio output of an error, or causes vibrations for notifying an error. For example, the communication apparatus 101 displays an error message illustrated in FIG. 8. Afterward, the processing illustrated in FIG. 6 ends.

If the base station not in the slice-unavailable base station list is not near the communication apparatus 101 (NO in step S601), the processing may repeat step S601, instead of proceeding to step S602. In other words, the communication apparatus 101 may wait until the base station not in the slice-unavailable base station list is detected.

If the base station not in the slice-unavailable base station list is near the communication apparatus 101 (YES in step S601), the processing proceeds to step S603. In step S603, the communication apparatus 101 selects the base station not in the slice-unavailable base station list, as a base station to be connected. In step S604, the communication apparatus 101 transmits an RRC connection request to the selected base station to be connected.

Next, in step S605, the communication apparatus 101 determines whether an RRC Connection Setup message is received from the selected base station to be connected. If the RRC Connection Setup message is not received (NO in step S605), the communication apparatus 101 waits until the RRC Connection Setup message is received from the base station.

If the RRC Connection Setup message is received (YES in step S605), the processing proceeds to step S606. In step S606, the communication apparatus 101 determines whether information about a desired network slice is included in the received message. This step is similar to step S502 and step S504 in FIG. 5. In other words, the communication apparatus 101 determines that the information about the desired network slice is included in the received message (YES in step S606), if a result of the determination in step S502 is YES and a result of the determination in step S504 is YES. The communication apparatus 101 determines that the information about the desired network slice is not included in the received message (NO in step S606), if a result of the determination in step S502 is NO or a result of the determination in step S504 is NO.

If the communication apparatus 101 determines that the information of the desired network slice is included in the received message (YES in step S606), the processing proceeds to step S607. In step S607, the communication apparatus 101 completes RRC connection processing. This step is similar to step S505 in FIG. 5.

If the communication apparatus 101 determines that the information about the desired network slice is not included in the received message (NO in step S606), the processing proceeds to step S608. In step S608, the communication apparatus 101 adds this base station to the slice-unavailable base station list. More specifically, the communication apparatus 101 stores the identifier of this base station and the date and time of the determination in step S606 in association with each other (as a pair) in the slice-unavailable base station list. In step S609, the communication apparatus 101 cancels the RRC connection processing. This step is similar to step S503 in FIG. 5. Afterward, the processing returns to step S601. The communication apparatus 101 can thus attempt to connect to another base station.

As described above, in a case where a network slice that can be provided by a base station to which the communication apparatus has attempted to connect first is not a desired network slice, the communication apparatus can attempt to connect to another base station, so that the possibility of connecting to a base station providing the desired network slice can be increased.

In place of or in addition to the date and time of the determination in step S606, the date and time of the addition to the slice-unavailable base station list may be used as the information stored in the slice-unavailable base station list. In place of or in addition to this, the date and time when the communication apparatus 101 has canceled the RRC connection processing for connection with the base station may be stored.

The communication apparatus 101 may delete information about a base station (information concerning a pair including this base station) from the slice-unavailable base station list, in a case where a predetermined time has elapsed since the date and time of the storage of this base station in the slice-unavailable base station list. Thus, even if a base station temporarily cannot provide a network slice requested by the communication apparatus 101, the communication apparatus 101 can attempt to connect to this base station when the base station is later enabled to provide the requested network slice. In other words, the communication apparatus 101 does not transmit an RRC connection request to a base station included in the slice-unavailable base station list, only within a predetermined period. Therefore, the communication apparatus can perform appropriate connection processing in response to a change, even in a case where the network slice providing status of the base station dynamically changes.

Next, a third exemplary embodiment will be described. In the third exemplary embodiment, a communication apparatus adds information about a network slice desired by an external device to an RRC connection request.

The following processing will be described as processing by a communication apparatus 101, and similar processing is performed by a communication apparatus 102. A hardware configuration and a software configuration of the communication apparatus 101 are similar to those in the first exemplary embodiment and thus will not be described. A base station 105 and a core network apparatus 106 each also have a hardware configuration similar to that in FIG. 3. The communication apparatus 101 operates as a relay apparatus that relays communication between the external device and the base station 105.

Figure 9:
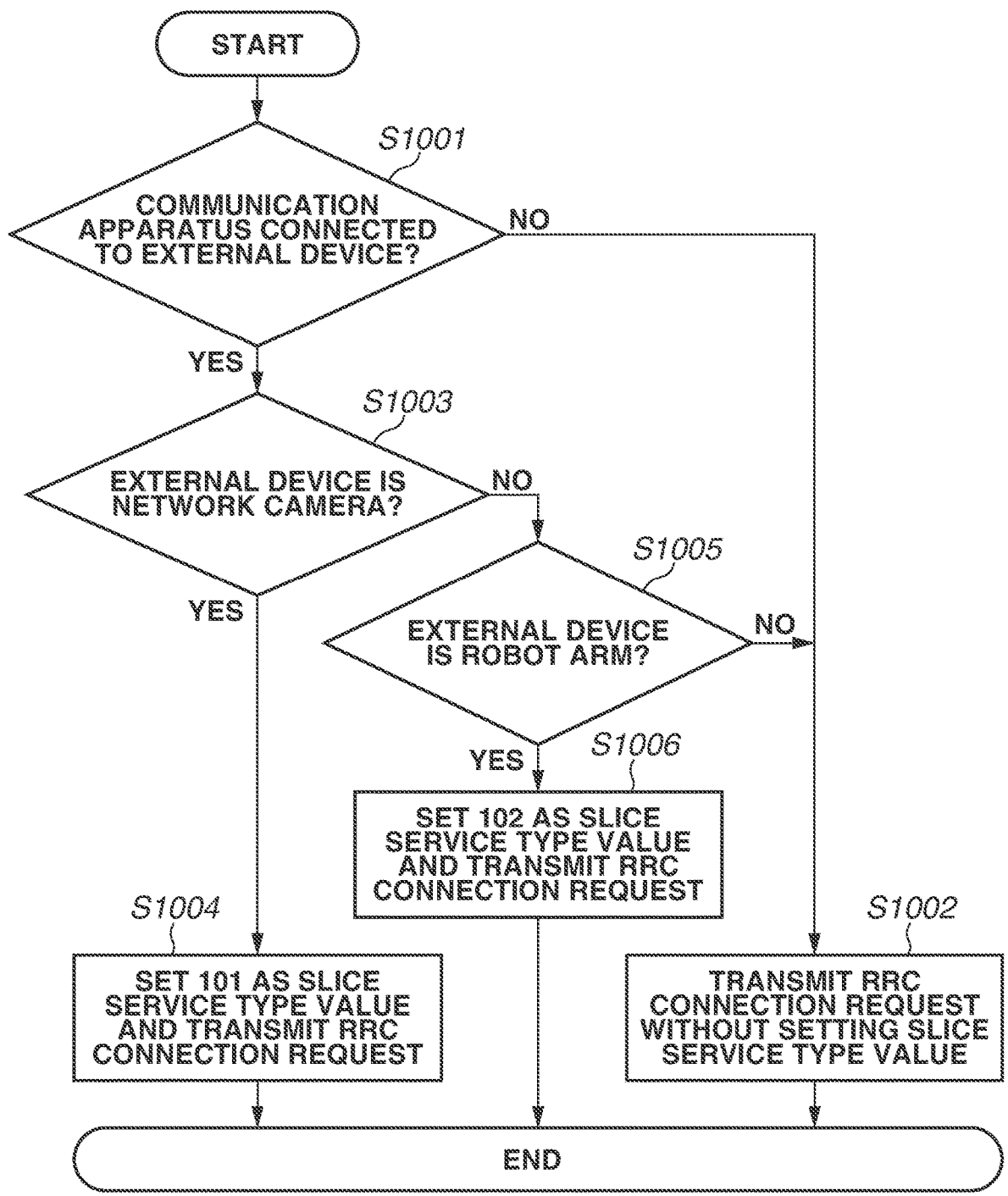
FIG. 9 is a flowchart of processing which is implemented by a communication apparatus according to a third exemplary embodiment.

FIG. 9 illustrates a flowchart of processing to be implemented by a control unit 302 executing a program read out from a storage unit 303 when RRC connection is performed in the communication apparatus 101. Some or all of steps in the flowchart illustrated in FIG. 9 may be implemented by a hardware device, such as an ASIC. The processing in the flowchart illustrated in FIG. 9 begins in a case where a user operation of turning on the communication apparatus 101 is performed, a user operation of activating a wireless communication unit 304 is performed, or a predetermined instruction is provided from an application or an external apparatus (not illustrated).

First, in step S1001, the communication apparatus 101 determines whether the communication apparatus 101 is connected to an external device. If the communication apparatus 101 is not connected to an external device (NO in step S1001), the processing proceeds to step S1002. In step S1002, the communication apparatus 101 transmits an RRC connection request to the base station 105 without setting a slice service type value, i.e., without including information about a requested network slice therein.

If the communication apparatus 101 is connected to an external device (YES in step S1001), the processing proceeds to step S1003. In step S1003, the communication apparatus 101 determines whether the connected external device is a network camera. If the connected external device is the network camera (YES in step S1003), the processing proceeds to step S1004. In step S1004, the communication apparatus 101 sets "101" as a slice service type value and transmits an RRC connection request to the base station 105. In other words, the communication apparatus 101 adds information indicating that a low latency slice service is requested to the RRC connection request, and transmits the RRC connection request to the base station 105.

If the communication apparatus 101 determines that the connected external device is not the network camera (NO in step S1003), the processing proceeds to step S1005. In step S1005, the communication apparatus 101 determines whether the connected external device is a robot arm. If the connected external device is not the robot arm (NO in step S1005), the processing proceeds to step S1002. In step S1002, the communication apparatus 101 transmits an RRC connection request to the base station 105 without setting a slice service type value, i.e., without including information about the requested network slice therein.

If the connected external device is the robot arm (YES in step S1005), the processing proceeds to step S1006. In step S1006, the communication apparatus 101 sets "102" to a slice service type value and transmits an RRC connection request to the base station 105. In other words, the communication apparatus 101 adds information indicating that a high reliability slice service is requested to the RRC connection request and transmits the RRC connection request to the base station 105.

In the flowchart in FIG. 9, the information about the network slice requested by the external device is added. However, in place of or in addition to this, information about a network slice requested by the communication apparatus 101 may be added to the RRC connection request. Here, the network slice requested by the communication apparatus 101 may be a network slice set beforehand as the communication apparatus 101 or set by a user, or may be a network slice requested by an application running on the communication apparatus 101.

Figure 10:
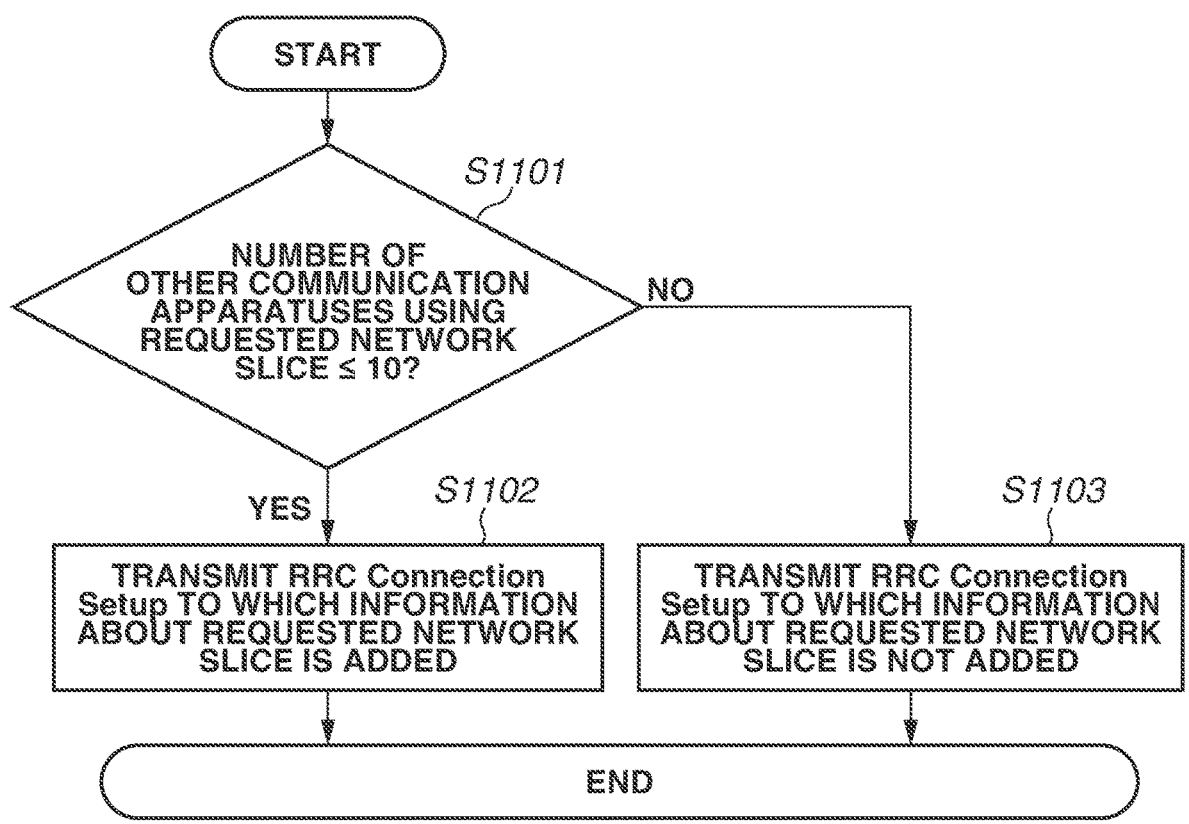
FIG. 10 is a flowchart of processing which is implemented by a base station or a core network apparatus according to one embodiment.

FIG. 10 illustrates a flowchart of processing implemented by the base station 105 in a case where the base station 105 receives an RRC connection request to which information about a requested network slice is added from the communication apparatus 101. The processing in this flowchart is implemented by a control unit executing a program read out from a storage unit. While the processing illustrated in FIG. 10 will be described below to be performed by the base station 105, the base station 105 may transfer the RRC connection request received from the communication apparatus 101 to the core network apparatus 106, and the core network apparatus 106 may implement the processing illustrated in FIG. 10.

First, in step S1101, the base station 105 determines whether the number of other communication apparatuses using the same network slice as the network slice requested by the communication apparatus 101 is less than or equal to a predetermined number (e.g., ten). If the number of other communication apparatuses is less than or equal to the predetermined number (YES in step S1101), the processing proceeds to step S1102. In step S1102, the base station 105 transmits an RRC Connection Setup message to which information about the requested network slice is added to the communication apparatus 101, as a response to the RRC connection request. If the number of other communication apparatuses is more than the predetermined number (NO in step S1101), the processing proceeds to step S1103. In step S1103, the base station 105 transmits an RRC Connection Setup message to which the information about the requested network slice is not added to the communication apparatus 101, as a response to the RRC connection request.

In this way, the base station 105 can notify the communication apparatus 101 of whether the requested network slice is available, based on the number of other communication apparatuses that are using the requested network slice.

In step S1101, the base station 105 may perform the determination based on the total communication data amount of one or more other communication apparatuses that are using the network slice, in place of the number of other communication apparatuses that are using the network slice. In this case, if the total communication data amount of one or more other communication apparatuses that are using the network slice is more than or equal to a predetermined threshold, the processing proceeds to step S1103. Here, the total communication data amount indicates a total communication data amount that the other communication apparatuses have communicated with the base station 105 within a predetermined period. If the total communication data amount is less than the threshold, the processing proceeds to step S1102. The base station 105 can thus notify whether the requested network slice is available, based on the total communication data amount.

Which criterion for the determination is to be used may be settable by a user in the base station 105. The base station 105 can thus notify whether the requested network slice is available, using the criterion intended by the user (e.g., an administrator in a local 5G system).

Except for the addition of the information about the network slice desired by the external device to the RRC connection request, the communication apparatus 101 performs processing similar to that of the first exemplary embodiment (FIG. 5) or the second exemplary embodiment (FIG. 6). However, instead of this, step S504 may be omitted and the processing may proceed to step S505 if a result of the determination in step S502 is YES, in the first exemplary embodiment (FIG. 5). In the second exemplary embodiment (FIG. 6), only the operation corresponding to step S502 may be performed as step S605 (i.e., the operation corresponding to step S504 is omitted). This can reduce the processing load of the communication apparatus 101.

As described above, the communication apparatus can request the base station to provide an appropriate network slice depending on the external device, in the RRC connection. In a case where information about a network slice desired by the communication apparatus 101 in place of or in addition to the external device is added, the communication apparatus 101 can request the base station to provide the network slice desired by the communication apparatus 101, in the RRC connection.

In a fourth exemplary embodiment, there will be described a case where RRC connection is disconnected after RRC connection processing is completed once instead of being canceled by a communication apparatus. While the following processing will be described as processing to be performed by a communication apparatus 101, similar processing is performed by a communication apparatus 102. A hardware configuration and a software configuration of the communication apparatus 101 are similar to those of the first exemplary embodiment and thus will not be described.

Figure 11:
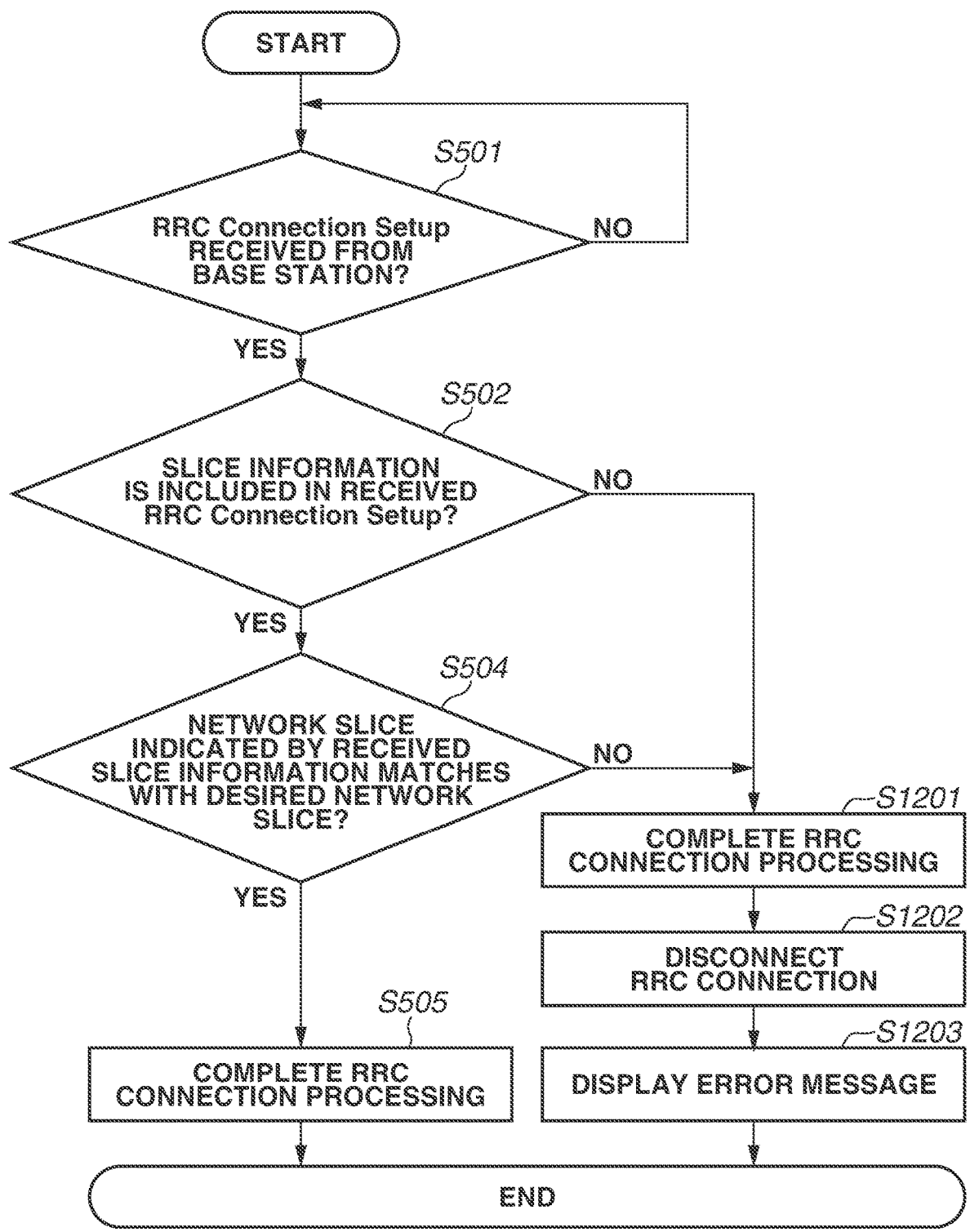
FIG. 11 is a flowchart of processing which is implemented by a communication apparatus according to a fourth exemplary embodiment.

FIG. 11 illustrates a flowchart of processing which is implemented by a control unit 302 executing a program read out from a storage unit 303 when RRC connection is performed in the communication apparatus 101. Some or all of the steps in the flowchart illustrated in FIG. 11 may be implemented by a hardware device, such as an ASIC. The processing in the flowchart illustrated in FIG. 11 begins when the communication apparatus 101 transmits an RRC connection request in response to a user operation of turning on the communication apparatus 101, a user operation of activating a wireless communication unit 304, or a predetermined instruction from an application or an external apparatus (not illustrated). Operations similar to those in steps in FIG. 5 are provided with the same reference numerals as those in FIG. 5 and will not be specifically described.

In the processing in FIG. 11 as well, the communication apparatus 101 receives an RRC Connection Setup message from a base station 105 (YES in step S501). If information about a desired network slice is not included in the RRC Connection Setup message (NO in step S502 or NO in step S504), the processing proceeds to step S1201. The operation in step S1201 is similar to the operation in step S505. In other words, in step S1201, the communication apparatus 101 completes the RRC connection processing for connection with the base station 105. Subsequently, in step S1202, the communication apparatus 101 disconnects the RRC connection with the base station 105. More specifically, initially, the control unit 302 of the communication apparatus 101 issues an Attention Hang-up the current call (ATH) command for disconnecting the RRC connection to the wireless communication unit 304. The ATH command is one of Attention (AT) commands that is a command for controlling a modem. In response to receiving the ATH command, the wireless communication unit 304 transmits an RRC disconnection request to the base station 105, thus disconnecting the RRC connection. Here, the RRC disconnection request is a "REQUEST PDP CONTEXT ACTIVATION REJECT" message or a "DEACTIVATE PDP CONTEXT REQUEST" message compliant with the 3GPP standard. The term "PDP" is an abbreviation of Packet Data Protocol. These messages are intended to deactivate a PDP context, and the RRC connection is disconnected as a result.

In step S1203, the communication apparatus 101 notifies a user that the RRC connection is disconnected. Here, this notification is performed by display or audio output, or causing vibrations. Thus, in a case where the desired network slice is not available, the RRC connection is disconnected, and the user can recognize that the RRC connection is disconnected.

In the processing in FIG. 11, the communication apparatus 101 may perform operation equivalent to the operation in step S505, i.e., may complete the RRC connection processing, if a result of the determination in step S501 is YES. Subsequently, the determination in each of step S502 and S504 is performed. In this case, the RRC connection processing (step S505 and step S1201) after the determination in each of step S502 and S504 is omitted. A similar operational effect can also be obtained by such an operation.

A storage medium storing a program code of software that implements the above-described function may be supplied to a system or apparatus, and a computer (a CPU or MPU) of the system or apparatus may read out the program code stored in the storage medium and execute the read-out program code. In this case, the program code read out from the storage medium implements the above-described function of the exemplary embodiment, and the storage medium storing the program code is included in the above-described apparatus.

Usable examples of the storage medium for supplying the program code include a flexible disk, a hard disk, an optical disk, an MO disk, a CD-ROM, a CD-R, a magnetic tape, a nonvolatile memory card, a ROM, and a DVD.

The above-described function may be implemented not only by the execution of the program code read out by the computer, but also by execution of a part or all of actual processing by an OS running on the computer based on an instruction of the program code.

Further, the above-described function may be implemented as follows. First, the program code read out from the storage medium is written into a memory included in an expansion board inserted into the computer or an expansion unit connected to the computer. Subsequently, based on an instruction of the program code, a CPU included in the expansion board or the expansion unit performs a part or all of the actual processing to implement the above-described function.

Various embodiments of the present disclosure can also be implemented by supplying a program that implements one or more functions of each of the above-described exemplary embodiments to a system or apparatus via a network or storage medium, and causing one or more processors in a computer of the system or apparatus to read out the program and execute the read-out program. Embodiments of the present disclosure can also be implemented by a circuit (e.g., an ASIC) for implementing the one or more functions.

While embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-022181, filed Feb. 13, 2020, which is hereby incorporated by reference herein in its entirety.

What is claimed is:

1. A communication apparatus comprising:
at least one memory that stores a set of instructions; and
at least one processor that executes the instructions, the instructions, when executed, causing the communication apparatus to perform operations comprising:
acquiring network slice information indicating a characteristic of a wireless network to be provided by a first base station;
determining, before completion of connection processing for connection with the first base station, whether a predetermined network slice is provided when becoming connected to the first base station, based on the acquired network slice information; and
cancelling connection processing for wireless connection with the first base station in a case where it is determined that the predetermined network slice is not provided when becoming connected to the first base station.

2. The communication apparatus according to claim 1, wherein the connection processing includes processing for Radio Resource Control connection compliant with 3rd Generation Partnership Project standard.

3. The communication apparatus according to claim 1, wherein the operations further comprise storing information about the first base station for which the connection processing is canceled, into a predetermined storage area,
wherein the communication apparatus does not start the connection processing for connection with the first base station indicated by the information stored in the predetermined storage area.

4. The communication apparatus according to claim 3, wherein the operations further comprise:
detecting base stations near the communication apparatus; and
notifying an error in a case where another base station different from the first base station indicated by the information stored in the predetermined storage area is not present among the detected base stations.

5. The communication apparatus according to claim 3, wherein second information relating to a timing at which a determination is made is stored with the information in the predetermined storage area.

6. The communication apparatus according to claim 1, wherein the operations further comprise starting connection processing for connection with a second base station different from the first base station, in a case where the connection processing for connection with the first base station is cancelled.

7. The communication apparatus according to claim 1, wherein the operations further comprise providing a user with a predetermined notification, in a case where the connection processing for connection with the first base station is cancelled.

8. The communication apparatus according to claim 1, wherein the communication apparatus is wired to a functional module and a base station that performs communication compliant with 3rd Generation Partnership Project standard and
wherein, after the completion of the connection processing for connection with the first base station, the communication apparatus receives or transmits data for the functional module via communication using the predetermined network slice.

9. The communication apparatus according to claim 8, wherein the functional module is a camera, and
wherein, after the completion of the connection processing for connection with the first base station, the communication apparatus transmits imaging data which is obtained from the camera via the communication using the predetermined network slice.

10. A communication method comprising:
acquiring network slice information indicating a characteristic of a wireless network to be provided by a base station;
determining, before completion of connection processing for connection with the first base station, whether a predetermined network slice is provided when becoming connected to the first base station, based on the acquired network slice information; and
cancelling connection processing for wireless connection between a communication apparatus and the base station, in a case where a determination that the predetermined network slice is not provided when becoming connected to the first base station is made.

11. A non-transitory computer readable storage medium that stores a program for causing a computer to execute:
acquiring network slice information indicating a characteristic of a wireless network to be provided by a base station;
determining, before completion of connection processing for connection with the first base station, whether a predetermined network slice is provided when becoming connected to the first base station, based on the acquired network slice information; and
cancelling connection processing for wireless connection between a communication apparatus and the base station, in a case where a determination that the predetermined network slice is not provided when becoming connected to the first base station is made.

12. A communication apparatus comprising:
at least one memory that stores a set of instructions; and
at least one processor that executes the instructions, the instructions, when executed, causing the communication apparatus to perform operations comprising:
acquiring network slice information indicating a characteristic of a wireless network to be provided by a first base station;
determining whether a predetermined network slice is provided through communication via the first base station, based on the acquired network slice information;
establishing a wireless connection with the first base station; and disconnecting the established wireless connection with the first base station, in a case where it is determined that the predetermined network slice is not provided through communication via the first base station.

13. The communication apparatus according to claim 12, wherein the wireless connection includes a connection for Radio Resource Control connection compliant with 3rd Generation Partnership Project standard.

14. The communication apparatus according to claim 12, wherein the operations further comprising storing information about the first base station with which connection is disconnected, into a predetermined storage area,
wherein the communication apparatus does not transmit a request for the connection, for a predetermined period, to the first base station indicated by the information stored in the predetermined storage area.

15. The communication apparatus according to claim 14, wherein the operations further comprising:
detecting base stations near the communication apparatus; and
notifying an error in a case where another base station different from the first base station indicated by the information stored in the predetermined storage area is not present among the detected base stations.

16. The communication apparatus according to claim 14, wherein second information relating to timing at which a determination is made is stored with the information in the predetermined storage area.

17. The communication apparatus according to claim 12, wherein the operations starting connection processing for connection with a second base station different from the first base station, in a case where the connection with the first base station is disconnected.

18. The communication apparatus according to claim 12, wherein the operations further comprising providing user with a predetermined notification, in a case where the connection with the first base station is disconnected.

19. A communication method comprising:
acquiring network slice information indicating a characteristic of a wireless network to be provided by a base station;
determining, before completion of connection processing for connection with the base station, whether a predetermined network slice is provided when becoming connected to the base station, based on the acquired network slice information; and
disconnecting wireless connection between a communication apparatus and the base station, based on a determination that the predetermined network slice is not provided when becoming connected to the base station.

20. A non-transitory computer readable storage medium that stores a program for causing a computer to execute:
acquiring network slice information indicating a characteristic of a wireless network to be provided by a base station;
determining, before completion of connection processing for connection with the base station, whether a predetermined network slice is provided when becoming connected to the base station, based on the acquired network slice information; and
disconnecting wireless connection between a communication apparatus and the base station, based on a determination that the predetermined network slice is not provided when becoming connected to the base station.

* * * * *